United States Patent
Pernodet et al.

(10) Patent No.: US 12,485,086 B2
(45) Date of Patent: Dec. 2, 2025

(54) COSMETIC COMPOSITIONS AND METHOD OF USING THE SAME

(71) Applicant: ELC MANAGEMENT LLC, Melville, NY (US)

(72) Inventors: Nadine Pernodet, Dix Hills, NY (US); Chia-Wen Chen, Eastchester, NY (US); Jacqueline Mary Trivero, Putnam Valley, NY (US); Krystel Rita Corallo, Huntington, NY (US)

(*) Notice: Subject to any disclaimer, the term of this patent is extended or adjusted under 35 U.S.C. 154(b) by 319 days.

(21) Appl. No.: 17/982,492

(22) Filed: Nov. 7, 2022

(65) Prior Publication Data

US 2023/0144550 A1    May 11, 2023

Related U.S. Application Data

(60) Provisional application No. 63/277,487, filed on Nov. 9, 2021.

(51) Int. Cl.
| | |
|---|---|
| *A61K 8/64* | (2006.01) |
| *A61K 8/9789* | (2017.01) |
| *A61K 8/98* | (2006.01) |
| *A61Q 19/08* | (2006.01) |

(52) U.S. Cl.
CPC .............. *A61K 8/9789* (2017.08); *A61K 8/64* (2013.01); *A61K 8/986* (2013.01); *A61Q 19/08* (2013.01)

(58) Field of Classification Search
CPC ......................................................... A61K 8/64
See application file for complete search history.

(56) References Cited

U.S. PATENT DOCUMENTS

| | | | |
|---|---|---|---|
| 9,687,439 B1 * | 6/2017 | Pernodet | .............. A61Q 19/10 |
| 10,821,180 B2 | 11/2020 | Moy | |
| 2017/0252292 A1 | 9/2017 | Pernodet et al. | |
| 2018/0353407 A1 | 12/2018 | Santhanam et al. | |
| 2019/0328645 A1 | 10/2019 | Hicks et al. | |

FOREIGN PATENT DOCUMENTS

| | | | |
|---|---|---|---|
| CN | 108778243 A | 11/2018 | |
| CN | 108834400 A | 11/2018 | |
| CN | 110339144 | 10/2019 | |
| CN | 111937750 A | 11/2020 | |
| CN | 112545948 | 3/2021 | |
| CN | 112675084 A | 4/2021 | |
| CN | 112972342 | 6/2021 | |
| JP | 2019502731 A | 1/2019 | |
| KR | 10-2010-0067698 | 6/2010 | |
| KR | 10-20100067698 A | 6/2010 | |
| KR | 2010067698 A * | 6/2010 | ............... A61K 8/97 |
| KR | 10-1495055 | 2/2015 | |
| KR | 10-1499442 | 3/2015 | |
| KR | 10-2018-0102485 A | 9/2018 | |
| KR | 10-2019-0044055 A | 4/2019 | |
| WO | WO-2017/127231 | 7/2017 | |

OTHER PUBLICATIONS

No reference is cited.*
China International Search Report from CN Application No. 202280074642.9; Date: Sep. 27, 2024; (with Eng. Transl.).
PCT International Search Report; International Application No. PCT/US2022/049175; Completion Date: Mar. 20, 2023; Mailing Date: Mar. 21, 2023.
PCT Written Opinion of the International Searching Authority; International Application No. PCT/US2022/049175; Completion Date: Mar. 20, 2023.

* cited by examiner

*Primary Examiner* — Qiuwen Mi
(74) *Attorney, Agent, or Firm* — Winston Zou

(57) ABSTRACT

Described herein are compositions comprising an extract from *Hibiscus* genus and an extract from damaged plant parts from the *Moringaceae* genus, and methods for stimulating collagen synthesis in skin cells. Also described herein are compositions comprising an extract from *Hibiscus* genus, an extract from damaged plant parts from the *Moringaceae* genus, and a complex of actives comprising at least one oligopeptide, at least one extract from the *Laminaria* genus, and whey protein.

23 Claims, No Drawings

COSMETIC COMPOSITIONS AND METHOD OF USING THE SAME

TECHNICAL FIELD

The disclosure is in the field of cosmetic compositions for treating aging skin, and with particular efficacy in stimulating synthesis of collagen in skin cells.

BACKGROUND OF THE DISCLOSURE

Collagen is one of the main structural proteins in skin. It can be found in the fibrillar or non-fibrillar form. The fibrillar form is most common and includes collagen subtypes I, II, III, V, and XI. Types I, IV, and V are most often associated with skin and dermal tissue. Collagen found in the skin typically diminishes with age and causes laxity, lines, and wrinkles on skin. Any active ingredient that induces skin cells to increase collagen synthesis is desirable because it ameliorates the adverse effects of collagen deficiency in skin cells which causes lines, wrinkles, and skin laxity.

It has been unexpectedly discovered that an extract obtained from *Hibiscus* genus in combination with an extract obtained from *Moringaceae* genus synergistically improved stimulation of collagen synthesis in skin cells. And it has also been unexpectedly discovered that a complex of actives further synergistically improved the efficacy of the combination of the extract obtained from *Hibiscus* genus and the extract obtained from *Moringaceae* genus on stimulating collagen synthesis in skin cells.

SUMMARY OF THE DISCLOSURE

The disclosure is directed to a topical composition comprising an extract from *Hibiscus* genus and an extract from the *Moringaceae* genus.

The disclosure is also directed to a topical composition comprising an extract from *Hibiscus* genus, an extract from the *Moringaceae* genus, and a complex of actives comprising at least one oligopeptide, at least one extract from the *Laminaria* genus, and whey protein.

The disclosure is also directed to methods of using a topical composition comprising an extract from *Hibiscus* genus and an extract from the *Moringaceae* genus.

The disclosure is also directed to methods of using a topical composition comprising a topical composition comprising an extract from *Hibiscus* genus, an extract from the *Moringaceae* genus, and a complex of actives comprising at least one oligopeptide, at least one extract from the *Laminaria* genus, and whey protein.

DETAILED DESCRIPTION

Definitions

As used herein, "*Hibiscus sinensis*" refers to all synonyms: "*Abelmoschus mutabilis*", "*Abelmoschus venustus*", "*Hibiscus immutabilis*", "*Hibiscus javanicus*", "*Hibiscus mutabilis*" and "*Ketmia mutabilis*".

"Ethanolic extract" refers to an extract for which the extraction step from the plant is done in ethanol or a water/ethanol solution. It does not relate to extracts done by an extraction step in another solvent, solvent which is subsequently evaporated, the pellet being re-dissolved in ethanol or a water/ethanol solution.

"Hydroglycolic extract" means that the extraction step from the plant is done in a water/butylene glycol solution. It does not relate to extracts done by an extraction in another solvent, solvent which is subsequently evaporated, the pellet being re-dissolved in a water/butylene glycol solution.

As used herein, "and/or" means "and" or "or". For example, "A and/or B" means "A, or B, or both A and B". Therefore, within the meaning of this disclosure, the "white flowers and/or light pink flowers" refers to white flowers only, or light pink flowers only, or a mixture of white and light pink flowers, the ratio of white flowers to light pink flowers being irrelevant.

A. The Compositions

In some embodiments of this disclosure, the composition may be in the liquid, semi-solid, or solid form, and may be in the emulsion, solution, suspension, or anhydrous form.

In some embodiments, the composition of the disclosure may comprise an extract from *Hibiscus* genus and an extract from the *Moringaceae* genus. In some aspects, the composition of the disclosure may further comprise a complex of actives comprising at least one oligopeptide, at least one extract from the *Laminaria* genus, and whey protein.

1. The Extract from the *Hibiscus* Genus:

The composition may comprise at least one extract obtained by extraction of plant parts from a plant of the *Hibiscus* genus. The extract from the *Hibiscus* genus may be present in amounts ranging from about 0.001 to 5%, preferably from about 0.005 to 3%, more preferably from about 0.01 to 2%, most preferably from about 0.1 to 1%, by weight of the total composition.

*Hibiscus* is a genus of flowering plants that includes both annual and perennial herbaceous plants, as well as woody shrubs and small trees. The flower color of certain species of *Hibiscus* genus, such as *Hibiscus sinensis* and *Hibiscus tiliaceus*, changes with the flower age. Preferred species of *Hibiscus* genus are the ones whose flower color changes with age. More preferred species of the *Hibiscus* genus is *Hibiscus sinensis*.

The plant parts that may be used include stems, leaves, roots, sprouts, seeds, twigs, flowers, bark, etc. Preferred plant parts are leaves, twigs, bark, and flowers. Most preferred plant parts are flowers.

*Hibiscus sinensis* flowers deploy their corolla in the morning, when the flowers are stained with an ivory white color. Over the course of the day, the petals become increasingly pink, and they are an intense pinkish red at the end of flowering. Thus white or light pink *Hibiscus sinensis* flowers are considered as young flowers, and red *Hibiscus sinensis* flowers are not considered as young flowers. The preferred *Hibiscus sinensis* flowers are young flowers (i.e., white flowers and/or light pink flowers).

Suitable extractants include water, alkanes, ethers, aromatic solvents, ketones and the like. Preferred is water alone, water/solvent mixtures, or solvent alone where the solvents comprise mono-, di-, or polyhydric alcohols such as ethanol, propanol, isopropanol, butanol, methanol. The extractant may be combined with the plant parts in any suitable ratio including 1:1-10 to 1-10:1 ratio of solvent/water respectively. More preferably, the *Hibiscus sinensis* extract is the hydroglycolic extract of *Hibiscus sinensis* flowers.

In some aspects, the extract from *Hibiscus* genus according to the disclosure may be made from young *Hibiscus* flowers. In some preferred aspects, the extract from *Hibiscus* genus according to the disclosure may be made from young *Hibiscus* flowers that do not show signs of aging. In some alternatively preferred aspects, the extract from *Hibiscus* genus according to the disclosure may be made from young *Hibiscus* flowers that show minimum concentration of the oxidation marker Cy-3-S.

In some preferred aspects, the extract from the *Hibiscus sinensis* according to the disclosure may be obtained from *Hibiscus sinensis* white flowers and/or light pink flowers. In some more preferred aspects, the extract from the *Hibiscus sinensis* according to the disclosure may comprise at least 2 ppm of N-(1-deoxy-1-fructosyl)-proline (a glycosylated amino acid with molar mass 277 Da) and/or at least 145 ppm of sarmentosin epoxide (a glycoside with molar mass 291 Da).

Conversely, the hydroglycolic extract of red *Hibiscus sinensis* flower comprises little or none of these two molecules (less than 2 ppm of N-(1-deoxy-1-fructosyl)-proline and less than 145 ppm of sarmentosin epoxide).

In some more preferred aspects, the extract of *Hibiscus sinensis* according to the disclosure comprises few or no maturity marker molecules, namely citric acid and another organic acid, with a structure close to citric acid. In some most preferred aspects, the extract of *Hibiscus sinensis* comprises less than 150 ppm of citric acid with a molar mass of 192 Da, and/or less than 60 ppm of an isomeric of citric acid with a molar mass of 192 Da.

Conversely, the hydroglycolic extract of red *Hibiscus sinensis* flower comprises more than 150 ppm of citric acid and more than 60 ppm of an isomeric of citric acid with a molar mass of 192 Da.

In some particularly preferred aspects, the extract from *Hibiscus sinensis* according to the disclosure may have at least one feature selected from the group of: the extract from *Hibiscus sinensis* flowers comprises at least 50% carbohydrates by dry weight of the extract; the extract from *Hibiscus sinensis* flowers comprises minerals and/or proteins, preferably less than 20% minerals and/or less than 20% proteins, the percentages being given by dry weight of the extract; at least 30% by dry weight of the carbohydrates present in the extract from *Hibiscus sinensis* flowers are oligosaccharides and polysaccharides with molar masses of between 360 and 1,620 Da; and the proteins present in the extract from *Hibiscus sinensis* flowers are peptides with molar masses below 2,000 Da. In some most preferred aspects, the extract from *Hibiscus sinensis* flowers may have all above-mentioned features of this paragraph.

The most preferred extract from *Hibiscus sinensis* according to the disclosure, which may be obtained from *Hibiscus sinensis* white flowers and/or light pink flowers, have all following features: comprising at least 2 ppm of N-(1-deoxy-1-fructosyl)-proline and/or at least 145 ppm of sarmentosin epoxide; comprising less than 150 ppm of citric acid with a molar mass of 192 Da and/or less than 60 ppm of an isomeric of citric acid with a molar mass of 192 Da; comprising at least 50% carbohydrates by dry weight of the extract; comprising less than 20% minerals and/or less than 20% proteins, the percentages being given by dry weight of the extract; at least 30% by dry weight of the carbohydrates present in the extract from *Hibiscus sinensis* are oligosaccharides and polysaccharides with molar masses of between 360 and 1,620 Da; and the proteins present in the extract from *Hibiscus sinensis* are peptides with molar masses below 2,000 Da.

The suitable extract from *Hibiscus sinensis* may be obtained by the method comprising carrying out the following steps: solubilizing the *Hibiscus sinensis* flowers powder in a water/butylene glycol mixture; separating the soluble and insoluble phases, to recover the soluble phase; filtrations; sterilizing filtration.

An example of a suitable extract from *Hibiscus sinensis* may be purchased from SILAB under the trade name Hibisculine®.

2. The Extract from the *Moringaceae* Genus:

The composition may comprise at least one extract obtained by extraction of damaged plant parts from a plant of the *Moringaceae* genus. The extract may present in amounts ranging from about 0.001 to 5%, preferably from about 0.005 to 3%, more preferably from about 0.01 to 2%, most preferably from about 0.1 to 1% by weight of the total composition.

Plants from this genus grow prevalently in Africa and India. *Moringaceae* is a genus of flowering plants that vary in size from large trees to small flowering plants. There are 13 species. The species *drouhardii, hildebrandtii, ovalifolia,* and *stenopetala* are massive trees with large water storing trunks ("bottle trees") and small radial and symmetrical flowers. The species *concanensis, oleifera,* and *peregrina* are slender trees with a tuberous juvenile stage and pale white or pink flowers. The species *arborea, borziana, longituba, pygmaea, rivae, ruspoliana* in the form of trees, shrubs, or herbs. *Moringaceae oleifera* in particular is a fast-growing tree that is often referred to as the "drumstick tree". *Moringaceae* leaves are said to contain high amounts of vitamins, polyphenols and four unique sugar modified aromatic glycosides. Isothiocyanates from *Moringaceae* (or *Moringaceae isocthiocyanates* ("MIC")) are said to have many health benefits. In general, isothiocyanates are formed when an enzyme, myrosinase (aka thioglucoside glycohydrolase), cleaves thio-linked glucose in precursor glucosinolates. *Moringaceae* extracts with higher concentrations of MICs are most desirable. Such extracts can be prepared by injuring the plant parts to cause an increase in the myrosinase enzyme content, which in turn will promote conversion of *Moringaceae* glucosinolates ("MGL") into MICs.

*Moringaceae* extracts that may be used in the compositions of the invention are further described in Phytochemistry, Vol 103 (2014), pages 114-122; and U.S. provisional patent application serial nos. 61/898,795 filed Nov. 1, 2013; 62/032,496, filed Aug. 1, 2014; and U.S. Ser. No. 14/683,730, a continuation-in-part of PCT/US2014/0063178, filed Oct. 30, 2014, all being incorporated by reference in their entirety.

Injuring the plant parts can occur by processing steps such as pressing, slicing, pulverizing, crushing, blending, or grinding. Injury (and myrosinase production) can also be induced by subjecting the plant parts to a solution containing water. This solution may be all water, or a mixture of water of various solvents such as ethanol, propanol, isopropanol, butylene glycol propylene glycol, pentylene glycol, and so on. It is preferred that such injury occur at temperatures lower than 100° C. and without otherwise exposing the plant parts to extreme weather conditions such as low temperatures or harsh drying conditions. The conditions inducing plant injury should take place for a period of time sufficient to activate the myrosinase enzyme in an amount sufficient to cause increased production of MICs in the injured plant parts.

The plant parts that may be used include stems, leaves, roots, sprouts, seeds, twigs, flowers, bark, etc. Most preferred is where the plant parts that are injured are from seeds, sprouts, or leaves. It is preferred that the plant parts are fresh, that is, they have not been dried or frozen.

After injury of the plant parts, they may be extracted or dried. Suitable extractants may be water or mixtures of water and solvents as noted above. The injured plant parts may be extracted immediately, or extracted after drying.

Suitable extractants include water, alkanes, ethers, aromatic solvents, ketones and the like. Preferred is water alone, water/solvent mixtures, or solvent alone where the solvents comprise mono-, di-, or polyhydric alcohols such as ethanol, propanol, isopropanol, butanol, methanol. The extractant may be combined with the plant parts in any suitable ratio including 1:1-10 to 1-10:1 ratio of solvent/water respectively.

It is preferred that the concentration of MIC in the extract should be at least 0.5 to 10% of MICs per gram of plant material, preferably 0.75 to 4%, more preferably from 0.8 to 5%. Harsh temperatures or drying of plant parts will cause rapid degradation of the MICs present in the plant parts and resulting extract.

Most preferred is *Moringaceae oleifera* seed extract containing from about 0.5 to 3.0% MICs, more preferably 0.75 to 2.5% MIC, most preferably from about 0.8 to 1.5% MICs. This extract may be purchased from Nutrasorb LLC under the trade name Nutringa® which is mixture of *Moringaceae oleifera* seed extract and isoceteth-20 in a ratio of about 7.5 to 92.5 respectively, and containing about 1% MIC. The MIC content of the best embodiment extract when tested for stability at 25° C. and 37° C. for 30 days is greater than 65%, preferably greater than 70%.

*Moringaceae oleifera* seed extract that may be used in the compositions of the invention are further described in U.S. Pat. No. 9,687,439, being incorporated by reference in its entirety, where it was discovered that *Moringaceae oleifera* seed extract itself does not have activity in stimulating collagen production in normal human dermal fibroblasts ("NHDF"), and in fact, in most cases, causes decreased collagen synthesis.

3. The Oligopeptide:

The composition may comprise at least one oligopeptide in an amount ranging from about 0.000001 to 5%, preferably from about 0.00001 to 2%, more preferably from about 0.0005 to 1% by weight of the total composition.

Suitable oligopeptides are those having from about 2 to 20, preferably from about 4 to 10, or most preferably 5 to 6 amino acids. The peptides may be substituted with acyl groups such as acetyl, palmitoyl, and the like. Examples of suitable oligopeptides include but are not limited to dipeptides, tripeptides, pentapeptides, hexapeptides, heptapeptides, and so on. Suitable acyl groups include acetyl, palmitoyl, or myristoyl. Further specific examples include hexapeptides 1-60, said range including each whole integer between 1 and 60, hexapeptides that are acetylated, palmitoylated or myristoylated such as acetyl hexapeptides 1, 7, 8, 19, 20, 22, 24, 30, 31, 37, 38, 39, or 40. Particularly preferred is Acetyl Hexapeptide-8 which is obtained by the acetylation of Hexapeptide-8, a synthetic peptide containing arginine, glutamic acid, glutamine, and methionine. Acetyl Hexpeptide-8 can be purchased from Lipotec S.A. under the tradename Argireline®, which is a solution of about 0.05 parts Acetyl Hexpeptide-8, 93.35 parts water, with the remainder preservatives.

Also suitable are pentapeptides which may be acetylated, palmitoylated, or myristoylated. Examples of such pentapeptides include Pentapepides 1-50 which includes each integer inbetween. Particularly preferred is Palmitoyl pentapeptide-5.

Particularly preferred are oligopeptides having the INCI names Acetyl-hexapeptide-8, Palmitoyl oligopeptide, Tripeptide-32, Tetrapeptide-26, Palmitoyl hexapeptide-12, Oligopeptide-10, Oligopeptide-5, Oligopeptide-3, Pentapeptide-3, Tetrapeptide-51 amide, Heptapeptide, Palmitoyl pentapeptide-5 or combinations thereof. These peptides are defined by the International Nomenclature for Cosmetic Ingredients (INCI) and are terms known in the art.

4. The Extract from *Laminaria* Genus:

The composition may comprise at least one extract from the *Laminaria* genus. *Laminaria* is a genus that contains 30+ species of the brown algae Phaeophyceae, often referred to as kelp. Such extracts from the *Laminaria* genus include those of species *abyssalis, agardhii, appressirhiza, brasiliensis, brongardiana, bulbosa, bullata, complanata, digitata, ephemera, farlowii, groenlandica, hyperborea, inclinitorhiza, multiplicata, nigripes, ochroleuca, pallida, platymeric, rodriguezi, ruprechtii, sachalinensis, setchellii, sinclairii, solidungula,* or *yezoensis*. Preferred is where the extract from the *Laminaria* genus is also a SIRT3 activator. Preferred is where the extract is from *Laminaria digitata*, and more specifically an extract having laminarin content and/or a mannitol content ranging from 0.5 to 3% by weight, or from about 0.75 to 2.5%, by weight, or most preferably from about 1% by weight or greater, preferably around 2%. An example of a suitable extract of *Laminaria digitata* may be purchased from Barnet Products under the tradename Mitostime Di which is a mixture of 91 parts water, 8 parts Extract of *Laminaria Digitata*, and 1 part preservative. Preferably the Extract of *Laminaria Digitata* is obtained by aqueous extraction and leaching of lyophilized algae and sterilizing the microfiltration, followed by reverse osmosis to concentrate the active molecules.

In the preferred embodiment of the invention the extract may be present in the composition in amounts ranging from 0.0001 to 5%, preferably from about 0.001 to 2.5%, more preferably from about 0.01 to 1%.

5. Whey Protein:

The composition may comprise whey protein, in an amount ranging from 0.01 to 5%, preferably from about 0.05 to 3%, more preferably from about 0.1 to 2% by weight of the total composition.

Whey protein is the polypeptide obtained from the fluid part of milk after separation from curds. The whey protein may be hydrolyzed. Most preferred is a whey protein sold by Glanbia Foods having the trade name whey protein NXP.

6. Complex of Actives:

In one embodiment, the oligopeptide, *Laminaria* Extract and whey protein may be supplied to the composition in the form of a pre-blend that can then be formulated into the final product. In this case a ratio of from about 2-20 parts of oligopeptide, 1-10 parts *Laminaria* extract, and 0.1 to 5 parts whey protein is appropriate. Most preferred is a ratio of 10 parts Acetyl hexapeptide-8, 5 parts Extract of *Laminaria digitata*, and 1 part whey protein.

The composition of the invention may also further "comprise" other ingredients including but not limited to those set forth herein.

7 Other Ingredients:

The topical composition may contain the following ingredients:

Oils

Suitable oils include silicones, esters, vegetable oils, synthetic oils, including but not limited to those set forth herein. The oils may be volatile or nonvolatile, and are preferably in the form of a pourable liquid at room temperature. If present, the oils may range from about 0.5 to 85%, preferably from about 1-75%, more preferably from about 5-65% by weight of the total composition.

Cyclic and linear volatile silicones are available from various commercial sources including Dow Chemical Corporation and Momentive (formerly General Electric Silicones). The Dow Chemical linear volatile silicones are sold under the trade names Dowsil and Xiameter 244, 245, 344, and 200 fluids. These fluids include hexamethyldisiloxane (viscosity 0.65 centistokes (abbreviated cst)), octamethyltrisiloxane (1.0 cst), decamethyltetrasiloxane (1.5 cst), dodecamethylpentasiloxane (2 cst) and mixtures thereof, with all viscosity measurements being at 25° C.

Suitable branched volatile silicones include alkyl trimethicones such as methyl trimethicone, a branched volatile silicone having the general formula:

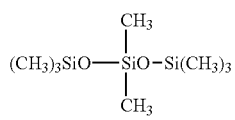

Methyl trimethicone may be purchased from Shin-Etsu Silicones under the trade name TMF-1.5, having a viscosity of 1.5 centistokes at 25° C.

Also suitable are various straight or branched chain paraffinic hydrocarbons having 5, 6, 7, 8, 9, 10, 11, 12, 13, 14, 15, 16, 17, 18, 19, or 20 carbon atoms, more preferably 8 to 16 carbon atoms. Suitable hydrocarbons include pentane, hexane, heptane, decane, dodecane, tetradecane, tridecane, and $C_{8-20}$ isoparaffins. Suitable Cu isoparaffins are manufactured by Permethyl Corporation under the tradename Permethyl 99A. Various $C_{16}$ isoparaffins commercially available, such as isohexadecane (having the tradename Permethyl R), are also suitable.

Also suitable are esters formed by the reaction of a carboxylic acid and an alcohol. The alcohol and the carboxylic acids may both have fatty (C6-30) chains. Examples include hexyl laurate, butyl isostearate, hexadecyl isostearate, cetyl palmitate, isostearyl neopentanoate, stearyl heptanoate, isostearyl isononanoate, stearyl lactate, stearyl octanoate, stearyl stearate, isononyl isononanoate, and so on.

The ester may also be in the dimer or trimer form. Examples of such esters include diisotearyl malate, neopentyl glycol dioctanoate, dibutyl sebacate, dicetearyl dimer dilinoleate, dicetyl adipate, diisocetyl adipate, diisononyl adipate, diisostearyl dimer dilinoleate, diisostearyl fumarate, diisostearyl malate, dioctyl malate, and so on.

Examples of other types of esters include those from arachidonic, citric, or behenic acids, such as triarachidin, tributyl citrate, triisostearyl citrate, tri $C_{12-13}$ alkyl citrate, tricaprylin, tricaprylyl citrate, tridecyl behenate, trioctyldodecyl citrate, tridecyl behenate; or tridecyl cocoate, tridecyl isononanoate, and so on.

Synthetic or naturally occurring glyceryl esters of fatty acids, or triglycerides, are also suitable for use in the compositions. Both vegetable and animal sources may be used. Examples of such oils include castor oil, lanolin oil, $C_{10-18}$ triglycerides, caprylic/capric/triglycerides, sweet almond oil, apricot kernel oil, sesame oil, *camelina sativa* oil, tamanu seed oil, coconut oil, corn oil, cottonseed oil, linseed oil, ink oil, olive oil, palm oil, illipe butter, rapeseed oil, soybean oil, grapeseed oil, sunflower seed oil, walnut oil, and the like.

Also suitable are synthetic or semi-synthetic glyceryl esters, such as fatty acid mono-, di-, and triglycerides which are natural fats or oils that have been modified, for example, mono-, di- or triesters of polyols such as glycerin. In an example, a fatty ($C_{12-22}$) carboxylic acid is reacted with one or more repeating glyceryl groups. glyceryl stearate, diglyceryl diiosostearate, polyglyceryl-3 isostearate, polyglyceryl-4 isostearate, polyglyceryl-6 ricinoleate, glyceryl dioleate, glyceryl diisostearate, glyceryl tetraisostearate, glyceryl trioctanoate, diglyceryl distearate, glyceryl linoleate, glyceryl myristate, glyceryl isostearate, PEG castor oils, PEG glyceryl oleates, PEG glyceryl stearates, PEG glyceryl tallowates, and so on.

Nonvolatile silicone oils, both water soluble and water insoluble, are also suitable for use in the composition. Such silicones preferably have a viscosity ranging from about greater than 5 to 800,000 cst, preferably 20 to 200,000 cst at 25° C. Suitable water insoluble silicones include amine functional silicones such as amodimethicone. Examples include dimethicone, phenyl dimethicone, diphenyl dimethicone, phenyl trimethicone, or trimethylsiloxyphenyl dimethicone. Other examples include alkyl dimethicones such as cetyl dimethicone, stearyl dimethcone, behenyl dimethicone, and the like.

Surfactants

The composition may contain one or more surfactants, especially if in the emulsion form. However, such surfactants may be used if the compositions are anhydrous also, and will assist in dispersing ingredients that have polarity, for example pigments. Such surfactants may be silicone or organic based. The surfactants will aid in the formation of stable emulsions of either the water-in-oil or oil-in-water form. If present, the surfactant may range from about 0.001 to 30%, preferably from about 0.005 to 25%, more preferably from about 0.1 to 20% by weight of the total composition.

Silicone surfactants may be generically referred to as dimethicone copolyol or alkyl dimethicone copolyol. In some cases, the number of repeating ethylene oxide or propylene oxide units in the polymer are also specified, such as a dimethicone copolyol that is also referred to as PEG-15/PPG-10 dimethicone, which refers to a dimethicone having substituents containing 15 ethylene glycol units and 10 propylene glycol units on the siloxane backbone. It is also possible for one or more of the methyl groups in the above general structure to be substituted with a longer chain alkyl (e.g., ethyl, propyl, butyl, etc.) or an ether such as methyl ether, ethyl ether, propyl ether, butyl ether, and the like.

Examples of silicone surfactants are those sold by Dow Silicones under the tradename Dowsil 3225C Formulation Aid having the CTFA name cyclotetrasiloxane (and) cyclopentasiloxane (and) PEG/PPG-18 dimethicone; or 5225C Formulation Aid, having the CTFA name cyclopentasiloxane (and) PEG/PPG-18/18 dimethicone; or Dowsil 190 Surfactant having the CTFA name PEG/PPG-18/18 dimethicone; or Dowsil 193 Fluid, Dowsil 5200 having the CTFA name lauryl PEG/PPG-18/18 methicone; or Abil EM 90 having the CTFA name cetyl PEG/PPG-14/14 dimethicone sold by Goldschmidt; or Abil EM 97 having the CTFA name bis-cetyl PEG/PPG-14/14 dimethicone sold by Goldschmidt; or Abil WE 09 having the CTFA name cetyl PEG/PPG-10/1 dimethicone in a mixture also containing polyglyceryl-4 isostearate and hexyl laurate; or KF-6011 sold by Shin-Etsu Silicones having the CTFA name PEG-11 methyl ether dimethicone; KF-6012 sold by Shin-Etsu Silicones having the CTFA name PEG/PPG-20/22 butyl ether dimethicone; or KF-6013 sold by Shin-Etsu Silicones having the CTFA name PEG-9 dimethicone; or KF-6015 sold by Shin-Etsu Silicones having the CTFA name PEG-3 dimethicone; or KF-6016 sold by Shin-Etsu Silicones having the CTFA name PEG-9 methyl ether dimethicone; or KF-6017 sold by Shin-Etsu Silicones having the CTFA name PEG-10 dimethicone; or KF-6038 sold by Shin-Etsu Silicones having the CTFA name lauryl PEG-9 polydimethylsiloxyethyl dimethicone.

Also suitable are various types of crosslinked silicone surfactants that are often referred to as emulsifying elastomers that contain at least one hydrophilic moiety such as polyoxyalkylenated groups. Polyoxyalkylenated silicone elastomers that may be used in at least one embodiment of the disclosure include those sold by Shin-Etsu Silicones under the names KSG-21, KSG-20, KSG-30, KSG-31, KSG-32, KSG-33; KSG-210 which is dimethicone/PEG-10/15 crosspolymer dispersed in dimethicone; KSG-310 which is PEG-15 lauryl dimethicone crosspolymer; KSG-320 which is PEG-15 lauryl dimethicone crosspolymer dispersed in isododecane; KSG-330 (the former dispersed in triethylhexanoin), KSG-340 which is a mixture of PEG-10 lauryl dimethicone crosspolymer and PEG-15 lauryl dimethicone crosspolymer.

Also suitable are polyglycerolated silicone elastomers like those disclosed in PCT/WO 2004/024798, which is hereby incorporated by reference in its entirety. Such elastomers include Shin-Etsu's KSG series, such as KSG-710 which is dimethicone/polyglycerin-3 crosspolymer dispersed in dimethicone; or lauryl dimethicone/polyglycerin-3 crosspolymer dispersed in a variety of solvent such as isododecane, dimethicone, triethylhexanoin, sold under the Shin-Etsu tradenames KSG-810, KSG-820, KSG-830, or KSG-840. Also suitable are silicones sold by Dow Silicones under the tradenames 9010 and DC9011.

The composition may comprise one or more nonionic organic surfactants. Suitable nonionic surfactants include alkoxylated alcohols, or ethers, formed by the reaction of an alcohol with an alkylene oxide, usually ethylene or propylene oxide. Preferably the alcohol is either a fatty alcohol having 6 to 30 carbon atoms. Examples of such ingredients include Steareth 2-100, which is formed by the reaction of stearyl alcohol and ethylene oxide and the number of ethylene oxide units ranges from 2 to 100; Beheneth 5-30 which is formed by the reaction of behenyl alcohol and ethylene oxide where the number of repeating ethylene oxide units is 5 to 30; Ceteareth 2-100, formed by the reaction of a mixture of cetyl and stearyl alcohol with ethylene oxide, where the number of repeating ethylene oxide units in the molecule is 2 to 100; Ceteth 1-45 which is formed by the reaction of cetyl alcohol and ethylene oxide, and the number of repeating ethylene oxide units is 1 to 45, and so on. All recitations of units include all whole integers between the range.

Other alkoxylated alcohols are formed by the reaction of fatty acids and mono-, di- or polyhydric alcohols with an alkylene oxide. For example, the reaction products of $C_{6-30}$ fatty carboxylic acids and polyhydric alcohols which are monosaccharides such as glucose, galactose, methyl glucose, and the like, with an alkoxylated alcohol. Examples include polymeric alkylene glycols reacted with glyceryl fatty acid esters such as PEG glyceryl oleates, PEG glyceryl stearate; or PEG polyhydroxyalkanotes such as PEG dipolyhydroxystearate wherein the number of repeating ethylene glycol units ranges from 3 to 1000.

Other suitable nonionic surfactants include alkoxylated sorbitan and alkoxylated sorbitan derivatives. For example, alkoxylation, in particular ethoxylation of sorbitan provides polyalkoxylated sorbitan derivatives. Esterification of polyalkoxylated sorbitan provides sorbitan esters such as the polysorbates. For example, the polyalkyoxylated sorbitan can be esterified with C6-30, preferably C12-22 fatty acids. Examples of such ingredients include Polysorbates 20-85, sorbitan oleate, sorbitan sesquioleate, sorbitan palmitate, sorbitan sesquiisostearate, sorbitan stearate, and so on.

Humectants

It may also be desirable to include one or more humectants in the composition. If present, such humectants may range from about 0.001 to 25%, preferably from about 0.005 to 20%, more preferably from about 0.1 to 15% by weight of the total composition. Examples of suitable humectants include glycols, sugars, and the like. Suitable glycols are in monomeric or polymeric form and include polyethylene and polypropylene glycols such as PEG 4-200, which are polyethylene glycols having from 4 to 200 repeating ethylene oxide units; as well as $C_{1-6}$ alkylene glycols such as propylene glycol, butylene glycol, pentylene glycol, and the like. Suitable sugars, some of which are also polyhydric alcohols, are also suitable humectants. Examples of such sugars include glucose, fructose, honey, hydrogenated honey, inositol, maltose, mannitol, maltitol, sorbitol, sucrose, xylitol, xylose, and so on. Also suitable is urea. Preferably, the humectants used in the composition of the disclosure are $C_{1-6}$, preferably $C_{2-4}$ alkylene glycols, most particularly butylene glycol.

Botanical Extracts

It may be desirable to include one or more botanical extracts in the compositions. If so, suggested ranges are from about 0.0001 to 10%, preferably about 0.0005 to 8%, more preferably about 0.001 to 5% by weight of the total composition. Suitable botanical extracts include extracts from plants (herbs, roots, flowers, fruits, seeds) such as flowers, fruits, vegetables, and so on, including yeast ferment extract, *Padina pavonica* extract, *Thermus thermophilis* ferment extract, *Camelina sativa* seed oil, *Boswellia serrata* extract, olive extract, *Aribodopsis thaliana* extract, *Acacia dealbata* extract, *Acer saccharinum* (sugar maple), acidopholus, acorns, *aesculus, agaricus*, agave, *agrimonia*, algae, aloe, citrus, *brassica*, cinnamon, orange, apple, blueberry, cranberry, peach, pear, lemon, lime, pea, seaweed, caffeine, green tea, chamomile, willowbark, mulberry, poppy, and those set forth on pages 1646 through 1660 of the CTFA Cosmetic Ingredient Handbook, Eighth Edition, Volume 2. Further specific examples include, but are not limited to, *Glycyrrhiza glabra, Salix nigra, Macrocycstis Pyrifera, Pyrus malta, Saxifraga sarmentosa, vitis Vinifera, Monts nigra, Scutellaria baicalensis, Anthemis nobilis, Salvia sclarea, Rosmarinus officianalis, Citrus medial limonum, Panax ginseng, Siegesbeckia orientalis, Fructus mume, Ascophyllum nodosum, Bifida* Ferment lysate, *Glycine soja* extract, *Beta vulgaris, Haberlea rhodopensis, Polygonum cuspidatum, Citrus aurantium* Dukis, *Vitis vinifera, Selaginella tamariscina, Humulus lupulus, Citrus reticulata* Peel, *Punica granatum, Asparagopsis, Curcuma longa, Menyanthes trifoliata, Helianthus annuus, Hordeum vulgare, Cucumis sativus, Evernia prunastri, Evernia furfuracea*, and mixtures thereof.

Particulate Materials

The compositions of the disclosure may contain particulate materials in the form of pigments, inert particulates, or mixtures thereof. If present, suggested ranges are from about 0.01-75%, preferably about 0.5-70%, more preferably about 0.1-65% by weight of the total composition. In the case where the composition may comprise mixtures of pigments and powders, suitable ranges include about 0.01-75% pigment and 0.1-75% powder, such weights by weight of the total composition.

The particulate matter may be colored or non-colored powders. Suitable non-pigmented powders include bismuth oxychloride, titanated mica, fumed silica, spherical silica, polymethylmethacrylate, micronized teflon, boron nitride, acrylate copolymers, aluminum silicate, aluminum starch octenylsuccinate, bentonite, calcium silicate, cellulose, chalk, corn starch, diatomaceous earth, fuller's earth, glyceryl starch, hectorite, hydrated silica, kaolin, magnesium aluminum silicate, magnesium trisilicate, maltodextrin, montmorillonite, microcrystalline cellulose, rice starch, silica, talc, mica, titanium dioxide, zinc laurate, zinc myristate, zinc rosinate, alumina, attapulgite, calcium carbonate, calcium silicate, dextran, kaolin, nylon, silica silylate, silk powder, sericite, soy flour, tin oxide, titanium hydroxide, trimagnesium phosphate, walnut shell powder, or mixtures thereof. The above-mentioned powders may be surface treated with lecithin, amino acids, mineral oil, silicone, or various other agents either alone or in combination, which coat the powder surface and render the particles more lipophilic in nature.

Suitable pigments are organic or inorganic. Organic pigments are generally various aromatic types including azo, indigoid, triphenylmethane, anthroquinone, and xanthine dyes which are designated as D&C and FD&C blues, browns, greens, oranges, reds, yellows, etc. Organic pigments generally consist of insoluble metallic salts of certified color additives, referred to as the Lakes. Inorganic pigments include iron oxides, ultramarines, chromium, chromium hydroxide colors, and mixtures thereof. Iron oxides of red, blue, yellow, brown, black, and mixtures thereof are suitable.

Vitamins

The compositions of the disclosure may contain vitamins and/or coenzymes. If so, 0.001-10%, preferably 0.01-8%, more preferably 0.05-5% by weight of the total composition is suggested. Suitable vitamins include ascorbic acid and derivatives thereof such as ascorbyl palmitate, tetrahexydecyl ascorbate, and so on; the B vitamins such as thiamine, riboflavin, pyridoxin, and so on, as well as coenzymes such as thiamine pyrophoshate, flavin adenin dinucleotide, folic acid, pyridoxal phosphate, tetrahydrofolic acid, and so on. Also suitable is Vitamin E and derivatives thereof such as Vitamin E acetate, nicotinate, or other esters thereof. In addition, Vitamins D and K are suitable.

Anti-Oxidants and Radical Scavengers

Anti-oxidants and radical scavengers are especially useful for providing protection against UV radiation which can cause increased scaling or texture changes in the stratum corneum and against other environmental agents which can cause skin damage. Such anti-oxidants/radical scavengers include, for example, tocopherol sorbate and other esters of tocopherol, and tocopherol sorbate.

Anti-Inflammatory Agents

Anti-inflammatory agents enhance the skin appearance benefits, by for example, contribution of uniformity and acceptable skin tone and/or color. Optionally, the anti-inflammatory agent includes a steroidal anti-inflammatory agent and a non-steroidal anti-inflammatory agent. The steroidal anti-inflammatory agent may be hydrocortisone. So-called "natural" anti-inflammatory agents are also useful. For example, alpha bisabolol, aloe vera, Manjistha (extracted from plants in the genus *Rubia*, particularly *Rubia cordifolia*), and Guggal (extracted from plants in the genus *Commiphora*, particularly *Commiphora Mukul*), kola extract, chamomile, and sea whip extract, may also be used.

Antimicrobial Agents

As used herein, "antimicrobial agents" means a compound capable of destroying microbes, preventing the development of microbes or preventing the pathogenic action of microbes. Antimicrobal agents are useful, for example, in controlling acne. Preferred antimicrobial agents are benzoyl peroxide, erythromycin, tetracycline, clindamycin, azelaic acid, sulfur resorcinol, phenoxyethanol, and Irgasan™ DP 300 (Ciba Geigy Corp., U.S.A.). A safe and effective amount of an antimicrobial agent may be added to emulsions herein, preferably from 0.001% to 10%, more preferably from 0.01% to 5%, still more preferably from 0.05% to 2%.

Chelators

As used herein, "chelator" refers to a compound that reacts for removing a metal ion from a system by forming a complex so that the metal ion cannot readily participate in or catalyze chemical reactions. The inclusion of a chelator is especially useful for providing protection against UV radiation which can contribute to excessive scaling or skin texture changes and against other environmental agents which can cause skin damage. Exemplary chelators that are useful herein are disclosed in U.S. Pat. No. 5,487,884, Bissett et al, issued Jan. 30, 1996; PCT application 91/16035 and 91/16034, Bush et al, published Oct. 31, 1995. Preferred chelators are furildioxime and derivatives thereof.

Silicone Elastomers

The compositions may include a non-emulsifying crosslinked organopolysiloxane elastomer. The term "non-emulsifying," as used herein, defines crosslinked organopolysiloxane elastomers from which polyoxyalkylene units are absent. Such elastomers are used to reduce the tackiness/stickiness feel associated with skin conditioning agents.

The elastomers may be dimethicone/vinyl dimethicone crosspolymers, vinyl dimethicone/lauryl dimethicone crosspolymers, C30-C45, alkyl ceteayl dimethicone/polycyclohexane oxide crosspolymers, and mixtures thereof.

Dimethicone/vinyl dimethicone crosspolymers are supplied by a variety of suppliers including Dow Corning (DC 9040 and DC 9041), General Electric (SFE 839), Shin Etsu (KSG-15, 16, 18 [dimethicone/phenyl vinyl dimethicone crosspolymer]), and Grant Industries (GRANSIL™ line of elastomers). Cross-linked organopolysiloxane elastomers and processes for making them are further described in U.S. Pat. No. 4,970,252 to Sakuta, et al., issued Nov. 13, 1990; U.S. Pat. No. 5,760,116 to Kilgour, et al., issued Jun. 2, 1998; U.S. Pat. No. 5,654,362 to Schulz, Jr., et al. issued Aug. 5, 1997.

The vinyl dimethicone/lauryl dimethicone crosspolymers include vinyl dimethicone/lauryl dimethicone crosspolymer & mineral oil (tradename KSG-41); vinyl dimethicone/lauryl dimethicone crosspolymer & isododecane (tradename KSG-42); vinyl dimethicone/lauryl dimethicone crosspolymer & triethylhexanoin (tradename KSG-43); vinyl dimethicone/lauryl dimethicone crosspolymer & squalane (tradename KSG-44). Each of these "KSG" denominated silicone elastomers is available from Shinestu Chemical.

Commercially available cyclomethicone and C30-C45 alkyl ceteayl dimethicone/polycyclohexane oxide crosspolymer is available from GE Silicone under the tradename Velvasil 125.

Whitening Agents

The compositions herein may further comprise from 0.001% to 10%, or from 0.1% to 5% of a whitening agent. Nonlimiting examples of suitable whitening agents are those which are compatible with aqueous compositions. The whitening agents may include active ingredients that not only alter the appearance of the skin, but also improve hyperpigmentation as compared to pre-treatment.

Useful whitening agents may include ascorbic acid compounds, azelaic acid, butyl hydroxy anisole, gallic acid and its derivatives, glycyrrhizinic acid, hydroquinoine, kojic acid, arbutin, mulberry extract, and mixtures thereof. Use of combinations of whitening agents is believed to be advantageous in that they may provide whitening benefit through different mechanisms.

The ascorbic acid compound may be an ascorbic acid salt or derivative thereof. Exemplary water-soluble salt derivatives include, but are not limited to, L-ascorbic acid 2-glucoside, L-ascorbyl phosphate ester salts such as sodium L-ascorbyl phosphate, potassium L-ascorbyl phosphate, magnesium L-ascorbyl phosphate, calcium L-ascorbyl phosphate, aluminum L-ascorbyl phosphate. L-ascorbyl sulfate ester salts can also be used. Examples are sodium L-ascorbyl sulfate, potassium L-ascorbyl sulfate, magnesium L-ascorbyl sulfate, calcium L-ascorbyl sulfate and aluminum L-ascorbyl sulfate.

PH Adjusters

The compositions may further comprise a pH adjuster to control the pH of the composition. Particularly, the pH of the composition of the present disclosure is within the range of from about 5 to about 8, or from about 5.2 to about 7.8, or from about 5.4 to about 7.6, for example about 5.4, about 5.6, about 5.8, about 6.0, about 6.2, about 6.4, about 6.6, about 6.8, about 7.0, about 7.2, about 7.4, about 7.6 and any ranges therebetween.

The compositions may further comprise from about 0.01% to about 5%, or from about 0.1% to about 3%, or from about 0.3% to about 2%, or from about 0.4% to about 1.8%, and or from about 0.5% to about 1.6%, for example about 0.4%, about 0.5%, about 0.6%, about 0.7%, about 0.8%, about 0.9%, about 1.0%, about 1.1%, about 1.2%, about 1.3%, about 1.4%, about 1.5%, about 1.6% and any ranges therebetween, by weight of the composition, of a pH adjuster, wherein said pH adjuster is selected from the group consisting of potassium hydroxide, sodium hydroxide, ammonium hydroxide, aminomethyl propanol, triethanolamine, tetrahydroxypropyl ethylene diamine and any combinations thereof.

When a polymeric emulsifier and a pH adjuster is used, it may be desired to optimize the ratio of the polymeric emulsifier to the pH adjuster. For example, the weight ratio of the polymeric emulsifier to the pH adjuster may be between about 1:5 and about 1:0.5, or between about 1:3 to about 1:1, for example about 1:3, about 1:2.5, about 1:2, about 1:1.5, about 1:1.1 and any ranges therebetween.

Thickeners

The compositions may further comprise a thickener (also called a thickening agent) or an additional thickener if the emulsifier in the composition also functions as a thickener. The compositions may comprise from about 0.1% to about 5%, or, alternatively, from about 0.2% to about 2%, of a thickener or an additional thickener when present. Suitable classes of thickeners include but are not limited to carboxylic acid polymers, polyacrylamide polymers, sulfonated polymers, copolymers thereof, hydrophobically modified derivatives thereof, and mixtures thereof.

The thickener may be an acrylate cross linked silicone copolymer network (also sometimes referred to as "polyacrylate siloxane copolymer network"). Suitable thickening agents may also generally include carboxylic acid polymers, polyacrylamide polymers or copolymers, sulfonated polymers, gum, clays, cellulose or modified cellulosic compositions, and the like.

The composition of the invention may also "consist essentially of" the extract from *Hibiscus* genus, the extract from damaged plant parts of *Moringaceae* genus, the oligopeptide, the extract from the *Laminaria* genus, and whey protein, which means a composition that contains the five ingredients mentioned and only additional ingredients that do not affect that basic and novel characteristics of the composition such as any ingredients mentioned in the other ingredients section, and inert ingredients that do not affect the collagen stimulating activity of the composition.

B. The Methods

In some embodiments, the disclosure is related to a method for stimulating collagen synthesis in skin cells by applying a composition comprising an extract from *Hibiscus* genus and an extract from damaged plant parts from the *Moringaceae* genus.

In some aspects, the disclosure is related to a method for stimulating collagen synthesis in skin cells by applying a composition comprising an extract from *Hibiscus* genus, an extract from damaged plant parts from the *Moringaceae* genus, and a complex of actives comprising an oligopeptide, an extract from the *Laminaria* genus, and whey protein.

The disclosure will be further described in connection with the following examples which are set forth for the purposes of illustration only.

EXPERIMENTAL

Example 1

Comparison samples were tested for their ability to stimulate collagen production in normal human dermal fibroblasts ("NHDF"). NHDF from a 62 year old donor were plated onto 6 well plates at a density of 50,000 cells/well and incubated at standard conditions (37° C./5% $CO_2$) overnight. Fibroblasts were grown in DMEM media supplemented with 10% Bovine Calf Serum and 1% Penicillin Streptomycin.

Comparable extracts were made from flowers being harvested at different times and extracted with the same process. Comparable Extract A was obtained from young *Hibiscus sinensis* flowers (Hibisculine® from SILAB). Comparable Extract B was made from dark pink *Hibiscus sinensis* flowers. And Comparable Extract C was obtained from red *Hibiscus sinensis* flowers.

The samples were treated with Comparable Extract A, B, or C at their active dosages of 0.0021%, 0.0105%, or 0.021% in fully supplemented media. The plates were incubated at standard conditions (37° C./5% $CO_2$) for 96 hours. Following incubation, supernatants were harvested and stored at −80° C.

After 96 hours incubation and supernatants were collected, cell counts were performed for cell viability. Each sample was washed once with PBS and then administered 0.25% trypsin. After cells detached from the 6 well plates, media was administered to each sample to neutralize the trypsin. Cell counts were done with the Vicell.

Collagen I production was assessed using the Pro Collagen Type I ELISA (Takara MK101) per vendor's protocol (Takara Bio, MK101). The optical density (OD) was measured at 450 nm.

Statistical analysis was performed on all samples using one-way ANOVA with a post test of Dunnett's in Graphpad InStat. The results are set forth below:

|         | Active Concentration | Collagen I Production | Standard Error Bars (SEM) | % Increase in collagen production |
|---------|---------------------|----------------------|---------------------------|-----------------------------------|
| Control | 0                   | 2.63E+03             | 5.57E+01                  | —                                 |
| A       | 0.0021              | 3.53E+03             | 5.71E+02                  | 34%                               |
|         | 0.0105              | 5.20E+03             | 1.36E+02                  | 98%                               |
|         | 0.021               | 7.44E+03             | 1.77E+02                  | 183%                              |
| B       | 0.0021              | 3.20E+03             | 2.69E+02                  | 21%                               |
|         | 0.0105              | 3.48E+03             | 2.01E+02                  | 32%                               |
|         | 0.021               | 3.54E+03             | 1.96E+02                  | 34%                               |
| C       | 0.0021              | 2.80E+03             | 1.41E+01                  | 6%                                |
|         | 0.0105              | 3.37E+03             | 2.26E+02                  | 28%                               |
|         | 0.021               | 4.69E+03             | 1.52E+02                  | 78%                               |

This experiment showed the critical importance of harvesting time when it comes to plants extracts and this precision is essential in order to deliver the best performance to the skin. The extract from young *Hibiscus sinensis* flowers (white flowers and/or light pink flowers) showed the significantly better efficacy of stimulating collagen production at all active concentrations.

Example 2

Composition samples were tested for their ability to stimulate collagen production in normal human dermal fibroblasts ("NHDF"). NHDF from older donors (a 61 year old and a 62 year old) were plated onto 6 well plates at a density of 50,000 cells/well and incubated at standard conditions (37° C./5% $CO_2$) overnight. Fibroblasts were grown in DMEM media supplemented with 10% Bovine Calf Serum and 1% Penicillin Streptomycin.

The composition samples were made from the ingredients and at the concentration listed in the table below and numbered as follows: (1) Extract of *Hibiscus sinensis*; (2) Extract of *Hibiscus sinensis*, and Extract of *Moringa oleifera*; (3) Extract of *Moringa oleifera*, Complex of Actives (Acetyl Hexapeptide-8, Extract of *Laminaria digitata*, and Whey Protein); (4) Extract of *Hibiscus sinensis*, Extract of *Moringa oleifera*, Complex of Actives (Acetyl Hexapeptide-8, Extract of *Laminaria digitata*, and Whey Protein).

| INCI Name                         | Active Dose (%) |
|-----------------------------------|-----------------|
| Extract of *Hibiscus sinensis*    | 0.021           |
| Extract of *Moringa Oleifera*     | 0.005           |
| Whey Protein                      | 0.1             |
| Extract of *Laminaria Digitata*   | 0.0125          |
| Acetyl Hexapeptide-8              | 0.0005          |

The control and samples were tested in fully supplemented media. The plates were incubated at standard conditions (37° C./5% $CO_2$) for 96 hours. Following incubation, supernatants were harvested and stored at −80° C.

After 96 hours incubation and supernatants were collected, cell counts were performed for cell viability. Each sample was washed once with PBS and then administered 0.25% trypsin. After cells detached from the 6 well plates, media was administered to each sample to neutralize the trypsin. Cell counts were done with the Vicell.

Collagen I production was assessed using the Pro Collagen Type I ELISA (Takara MK101) per vendor's protocol (Takara Bio, MK101). The optical density (OD) was measured at 450 nm.

Statistical analysis was performed on all samples using one-way ANOVA with a post test of Dunnett's in Graphpad InStat. The results are set forth below:

|          | Collagen 1 Production | Standard Error (SEM) | % Increase in collagen production |
|----------|----------------------|----------------------|-----------------------------------|
| Control  | 3.04E−03             | 2.09E−04             |                                   |
| Sample 1 | 4.83E−03             | 2.01E−04             | 59%                               |
| Sample 2 | 1.77E−02             | 2.83E−03             | 483%                              |
| Sample 3 | 1.85E−02             | 1.56E−03             | 510%                              |
| Sample 4 | 3.00E−02             | 2.09E−03             | 888%                              |

While Extract of *Moringa oleifera* itself does not have activity in stimulating collagen production, Extract of *Hibiscus sinensis* induced a 59% increase in collagen production. Further, the combination of Extract of *Hibiscus sinensis* and Extract of *Moringa oleifera* synergistically induced a 483% increase in collagen production. Additionally, the combination of Extract of *Hibiscus sinensis*, Extract of *Moringa oleifera* and the Complex of Actives induced a 888% increase, while the combination of Extract of *Moringa oleifera* and the Complex of Actives only induced a 510% increase.

Other Embodiments

While the invention has been described in connection with the preferred embodiment, it is not intended to limit the scope of the invention to the particular form set forth but, on the contrary, it is intended to cover such alternatives, modifications, and equivalents as may be included within the spirit and scope of the invention as defined by the appended claims. Therefore, other embodiments, including those can be easily modified by a person skilled in the art from the present disclosure, are also within the claims.

The invention claimed is:

1. A composition, comprising:
an extract from the *Hibiscus sinensis*, and
an extract from damaged plant parts from a *Moringaceae* genus,
wherein the extract from *Hibiscus sinensis* comprises at least 2 ppm of N-(1-deoxy-1-fructosyl)-proline and/or at least 145 ppm of sarmentosin epoxide, and
wherein the composition is in a form of an emulsion.

2. The composition of claim 1, wherein the extract from *Hibiscus sinensis* is obtained from *Hibiscus sinensis* white flowers and/or light pink flowers.

3. The composition of claim 1, wherein the extract from *Hibiscus sinensis* is a hydroglycolic extract.

4. The composition of claim 1, wherein the extract from *Hibiscus sinensis* comprises less than 60 ppm of an isomeric of citric acid with a molar mass of 192 Da.

5. The composition of claim 1, wherein the extract from *Hibiscus sinensis* comprises at least 50% carbohydrates by dry weight of the extract.

6. The composition of claim 5, wherein at least 30% by dry weight of the carbohydrates present in the extract from *Hibiscus sinensis* are oligosaccharides and polysaccharides with molar masses of between 360 and 1,620 Da.

7. The composition of claim 1, wherein the extract from *Hibiscus sinensis* comprises minerals and/or proteins.

8. The composition of claim 7, wherein the proteins are peptides with molar masses below 2,000 Da.

9. The composition of claim 7, wherein the extract from *Hibiscus sinensis* comprises less than 20% minerals.

10. The composition of claim 7, wherein the extract from *Hibiscus sinensis* comprises less than 20% proteins.

11. The composition of claim 1, wherein the extract from *Hibiscus sinensis* is present in an amount ranging from about 0.001 to 5% by weight of the total composition.

12. The composition of claim 1, wherein the extract from damaged plant parts from the *Moringaceae* genus has a concentration of *Moringa isothiocyanates* ranging from about 0.5% to 3.0% by weight of the total extract.

13. The composition of claim 1, wherein the extract from damaged plant parts from the *Moringaceae* genus is present in an amount ranging from 0.001 to 5% by weight of the total composition.

14. The composition of claim 1, further comprising a complex of actives comprising at least one oligopeptide, at least one extract from a *Laminaria* genus, and whey protein.

15. The composition of claim 14, wherein the oligopeptide is present in amounts ranging from 0.000001 to 5% by weight of the total composition.

16. The composition of claim 14, wherein the oligopeptide is Acetyl hexapeptide-8.

17. The composition of claim 14, wherein the at least one extract from the *Laminaria* genus is present in an amount ranging from 0.0001 to 5% by weight of the total composition.

18. The composition of claim 17, wherein the extract from the *Laminaria* genus is the extract from *Laminaria digitata* having a laminarin content and/or a mannitol content ranging from 0.5 to 3% by weight of the total extract.

19. The composition of claim 14, wherein the whey protein is present in amounts ranging from 0.01 to 5% by weight of the total composition.

20. A method for stimulating collagen synthesis in skin cells in a subject in need thereof, said method comprising applying the composition of claim 1 to the skin of said subject.

21. The method of claim 20, wherein the composition further comprises a complex of actives comprising an oligopeptide, an extract from a *Laminaria* genus, and whey protein.

22. The method of claim 20, wherein the composition is applied once or twice per day.

23. The method of claim 21, wherein a species from the *Moringaceae* genus is *Moringa oleifera*, the oligopeptide is Acetyl hexapeptide-8, and the *Laminaria* genus is *Laminaria digitata*.

* * * * *